(12) United States Patent
Gordon

(10) Patent No.: US 9,144,226 B2
(45) Date of Patent: *Sep. 29, 2015

(54) ANIMAL FEED MECHANISM

(75) Inventor: Timothy J. Gordon, Lansing, IA (US)

(73) Assignee: Fat Lump Buster, LLC, Lansing, IA (US)

( * ) Notice: Subject to any disclaimer, the term of this patent is extended or adjusted under 35 U.S.C. 154(b) by 18 days.

This patent is subject to a terminal disclaimer.

(21) Appl. No.: 13/559,853

(22) Filed: Jul. 27, 2012

(65) Prior Publication Data

US 2013/0186343 A1     Jul. 25, 2013

Related U.S. Application Data

(63) Continuation-in-part of application No. 13/135,102, filed on Jun. 25, 2011, now Pat. No. 8,573,829.

(60) Provisional application No. 61/517,476, filed on Apr. 20, 2011.

(51) Int. Cl.

| *B01F 15/02* | (2006.01) |
| *A01K 5/00* | (2006.01) |
| *B01F 7/00* | (2006.01) |
| *B01F 7/04* | (2006.01) |
| *B01F 15/00* | (2006.01) |
| *B01F 3/18* | (2006.01) |
| *A01K 5/02* | (2006.01) |

(52) U.S. Cl.
CPC .............. *A01K 5/002* (2013.01); *A01K 5/0258* (2013.01); *B01F 3/184* (2013.01); *B01F 7/00258* (2013.01); *B01F 7/047* (2013.01); *B01F 15/00714* (2013.01); *B01F 15/0289* (2013.01); *B01F 2015/0061* (2013.01)

(58) Field of Classification Search
CPC ..... B01F 5/0451; A01K 5/002; A01K 5/0258
USPC ................................ 366/155.2, 156.1, 156.2
See application file for complete search history.

(56) References Cited

U.S. PATENT DOCUMENTS

| 4,188,863 | A | * | 2/1980 | Grossi | ............................. | 99/286 |
| 5,241,898 | A | * | 9/1993 | Newnan | .......................... | 99/280 |
| 6,123,445 | A | * | 9/2000 | Grassi | ............................. | 366/20 |
| 2005/0276152 | A1 | * | 12/2005 | Goode et al. | ...................... | 366/6 |

* cited by examiner

*Primary Examiner* — Tony G Soohoo
*Assistant Examiner* — Anshu Bhatia
(74) *Attorney, Agent, or Firm* — Camille L. Urban; David M. Breiner

(57) ABSTRACT

An animal feed mechanism includes a manually operated slide valve interposed between a set of upper agitators and a set of lower screw conveyors. In some examples, two upper agitators are installed within a plastic funnel, and two lower screw conveyors are disposed within a metal auger housing. Each screw conveyor includes an auger driven by its own separate motor. Thus, there are two motors for rotating the two augers. The two motors can be energized individually to selectively rotate either auger or to rotate them concurrently. In some examples, a transmission coupling the two augers to the two agitators conveys power to rotate both agitators regardless of whether either one or both motor driven augers are operating.

7 Claims, 4 Drawing Sheets

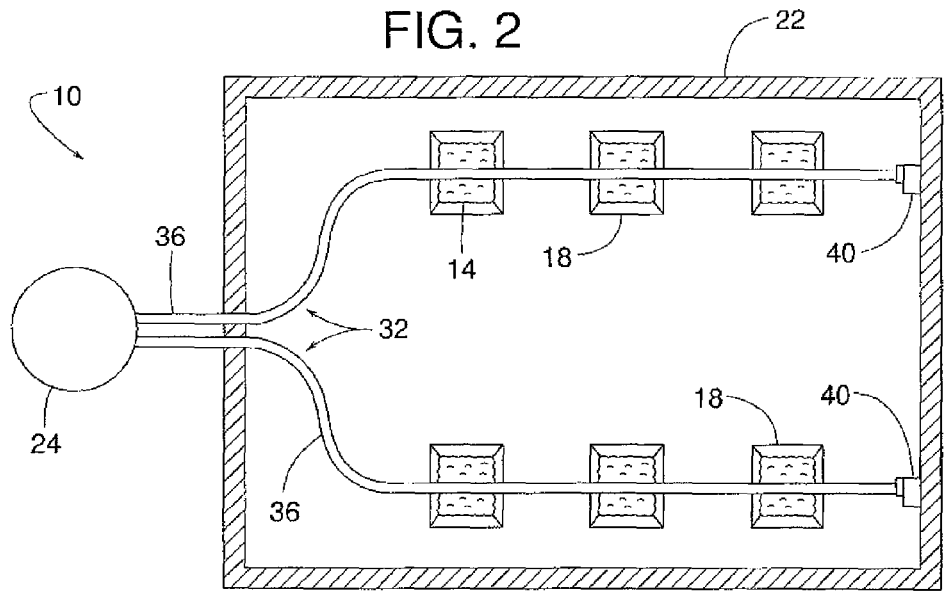
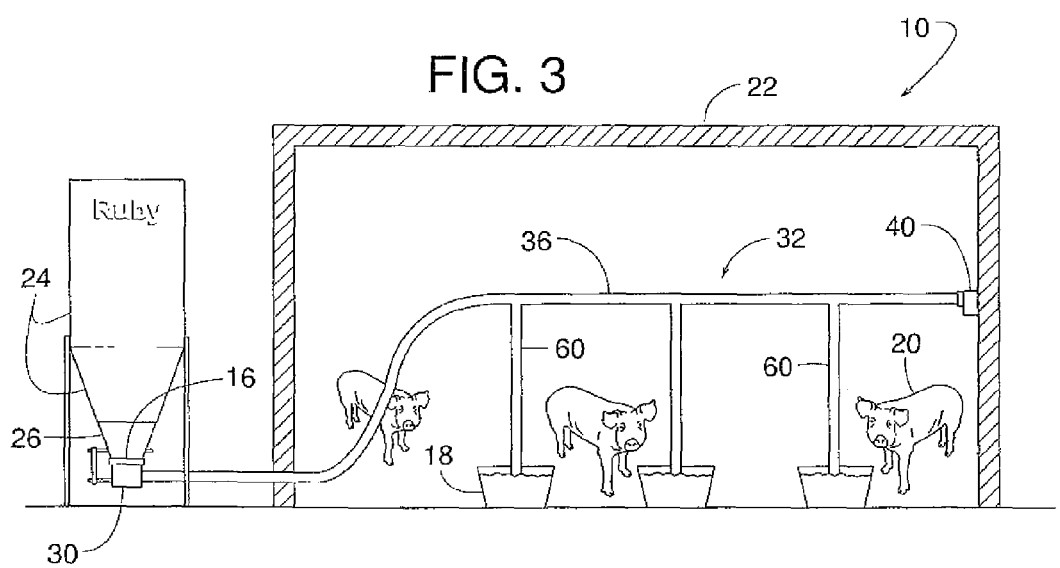

ANIMAL FEED MECHANISM

CROSS REFERENCE TO RELATED APPLICATIONS

This continuation-in-part application claims the benefit of nonprovisional patent application Ser. No. 13/135,102 filed on Jun. 25, 2011 now U.S. Pat. No. 8,573,829 by the present inventor which claims the benefit of provisional patent application Ser. No. 61/517,476 filed on Apr. 20, 2011 by the present inventor.

FIELD OF THE DISCLOSURE

The subject invention generally pertains to animal feed systems and more specifically to an animal feed mechanism for handling and conveying feed particulate matter.

BACKGROUND

Historically, many livestock breeds were fed grain or blended grains. Over time, additives in the form of nutritional or pharmaceutical materials were added to and mixed in with the blended grains. Oftentimes, grains were ground or otherwise reduced in size to create a more uniform and flowable mixture. The mixtures were stored in a bin or other container, and scooped into feeding devices for access by the animals to be fed.

As time went on, animals went from providing meat and other products to their owners, to provision of products for sale by their owners and, eventually, animals were produced and then sold to other entities for a variety of uses or to be made into a number of products. As the number of animals managed by a single producer increased, means for storing and feeding were developed. Among early developments were those that included a storage portion positioned above feeding stations wherein the feed in the storage portion moved via combination of gravity and open space as the animals consumed feed from the feeding stations. This same general arrangement is still used. However, as the number of animals managed by a single producer increased, so did the array and variety of equipment related to feeding those animals.

Animal production now includes producers that manage hundreds of animals housed in a variety of structures. It has become a science; administering, monitoring and tracking the type, rate, and amount of feed consumed along with any specific nutritional or pharmaceutical additives by each of hundreds or even thousands of animals is becoming more and more commonplace. For some types of livestock and/or breeding stock, such meticulous recordkeeping is required by regulation; for nearly all animal production, having this kind of information allows the producer to carefully monitor resources and increase the efficiency of production.

As mentioned, tracking this kind of data requires specialized equipment. Some of this equipment is geared to centralization of certain tasks either for uniformity and record keeping purposes, or for the purpose of reducing and standardizing the human efforts required; or for the purpose of increasing efficiencies in the process. To that end, a number of feeding related mechanisms have been devised. Specifically, for large confinements or structures in which a large number of animals are housed, mechanisms for delivery of feed to feeders in the individual or group enclosures within the building or structure have been created and implemented with varying levels of success. Many include augers enclosed in housings and some of these housing/auger combinations must be capable of moving feed through curves and inclines. A number of these operate by employing a central feed storage area such as a bin or bins along with means to convey the feed to the feeders. In some arrangements the bin(s) may be positioned centrally to a number of different structures to deliver feed to the feeders within those structures; in other arrangements the bin may be adjacent to or located in a structure in fluid communication with the feeders in that structure only. Permutations of these arrangements abound.

The feed which is provided to animals has changed over time as well. These changes are in response to new information and data as well as market demands. Grinding is still the most common method of feed processing for swine and certain other production. Particle size reduction of grains is known to increase the surface area of the grain, allowing for greater interaction with digestive enzymes, and improving feed efficiency. Smaller particles also improve the ease of handling and mixing characteristics. But, as with everything, there can be too much of a good thing: fine grinding will increase the energy costs of feed processing and may result in the feed bridging in feeders and bulk bins. increased dustiness, and the potential for gastric ulcers. Therefore, the increased costs of fine processing must be offset by the resulting improved feed conversion.

Moisture levels in feed, temperature, fat content and other factors can also effect the flowability of feed. As an example, in recent years, in an effort to increase feed efficiency without negatively offsetting its costs, some producers have begun using additives such as dried distiller's grains which are a byproduct of ethanol production and high in desirable content. However, these additives are "sticky" with moisture and/or fat content and under certain conditions or mixed in certain ratios, can increase bridging of feed in storage bins when it is being outloaded.

Currently, hoppers and powered screw conveyors are used for delivering feed to animals from the feed storage bin or container to the feeder mechanisms located in the animal enclosures. Such feed systems, however, have been known for being problematic and requiring periodic maintenance and attention in order to keep the feed flowing and the systems operating. These problems result in time for maintenance and repairs that, in turn, cause the animals to be without feed until the problem is cured. The industry is so highly dependent on feed regime that even a few hours can make a difference. Flowability both within the storage bin or container and of the feed as it exits the bin continues to be problematic despite several developments meant to address the issue. By way of example, products such as the Flow Hammer by Automated Production Systems attaches to the outside of a feed storage bin and delivers low frequency, high impact strikes to the bin in an effort to reduce or eliminate bridging. Other products vibrate the bin at much higher frequency. Further, at the lower end of most bins is positioned a hopper which is typically generally shaped like an inverted cone; below the hopper is a boot through which the grain flows and drops into the augering system to be moved to the feeding devices in the animal enclosures. Many feeding systems are automatically triggered by sensors related to levels of feed in the feeders at the enclosures, or may be activated by a timed schedule, or some combination of the above. In any case, the idea is to have a system that is as automated and dependable as possible to provide uniform feeding without unplanned disruptions, and with as little human intervention as possible. These features create an efficient system both from the standpoint of feed supply to the animals and from a cost savings standpoint related to moving the animals to finish and from reducing human intervention needs.

What was needed was a device to increase the dependability of feed flow to the animal enclosures and that does so by destroying lumps or balls of feed formed due to humidity, temperature, or feed content in the storage or other bin or during the outloading process as well as reduce feed bridging within the bin during the outloading process.

It is a first objective of the present invention to increase efficiency and dependability in feed outloading from storage bins;

It is a second objective of the present invention to reduce the negative effects of the formation of feed lumps or balls that disrupt feed flow from the bin;

It is a third objective of the present invention to reduce feed bridging in the storage bin during the outloading process.

Other objects, features, and advantages of the present invention will be readily appreciated from the following description. The description makes reference to the accompanying drawings, which are provided for illustration of the preferred embodiment. However, such embodiment does not represent the full scope of the invention. The subject matter which the inventor does regard as his invention is particularly pointed out and distinctly claimed in the claims at the conclusion of this specification.

BRIEF DESCRIPTION OF THE DRAWINGS

FIG. 2 is a top view of the animal feed mechanism installed at an example barn.

FIG. 3 is a side view of FIG. 2.

DETAILED DESCRIPTION

Figure 1:
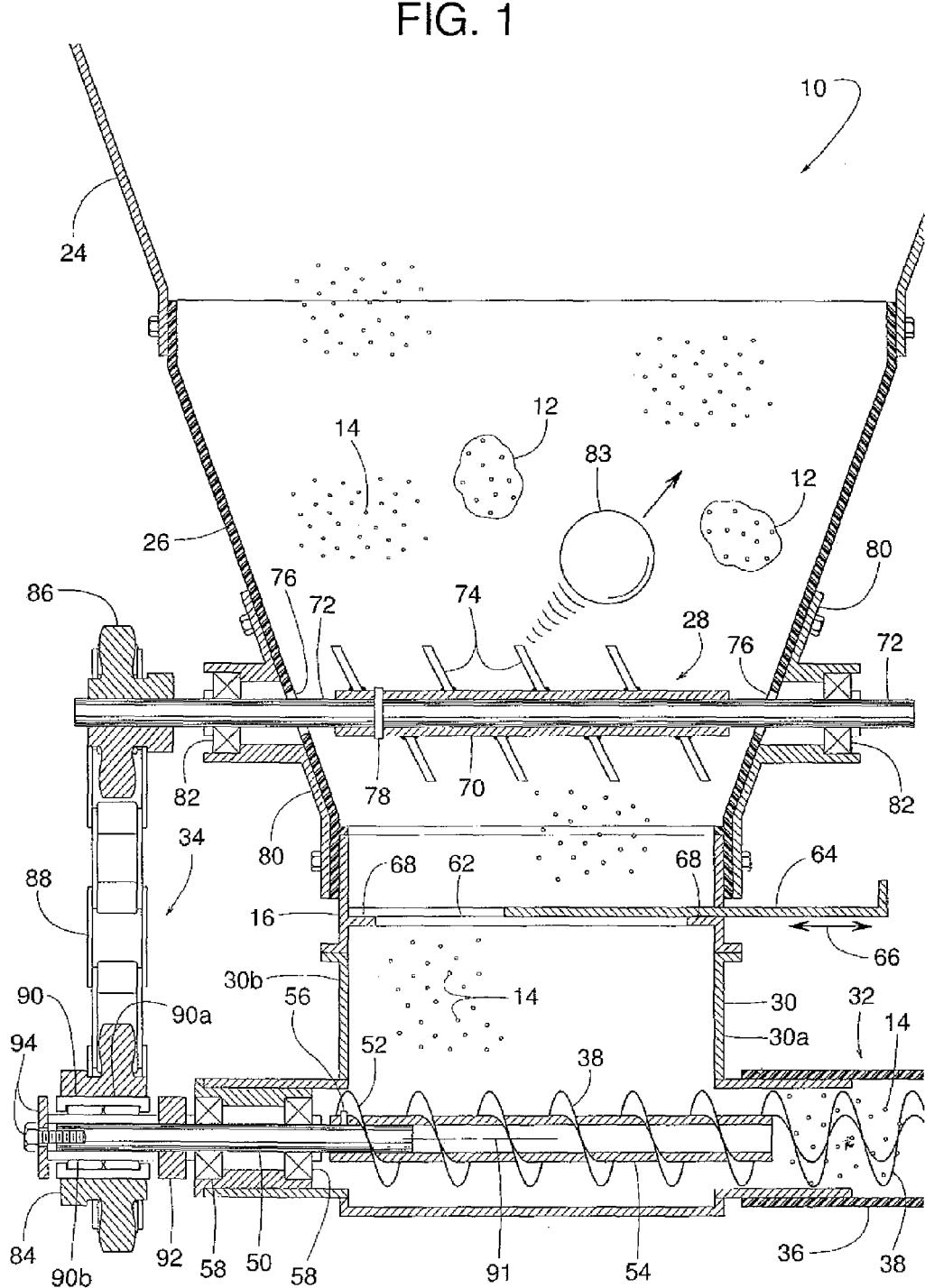
FIG. 1 is a cross-sectional view taken along line 1-1 of FIG. 6 and shows an example of an animal feed mechanism.

FIGS. 1-7 show an example animal feed mechanism 10 with novel means for breaking up chunks or balls 12 of feed particulate 14 (e.g., grain granules, corn, cereal, DDG's, moisture, pellets, etc.) that tend to collect and otherwise jamb in an area above a valve 16 in feed mechanism 10. Although feed mechanism 10 can be used in feeding a wide variety of animals in various environments, some examples of feed mechanism 10 are particularly suited for distributing feed 14 to a plurality of bins 18 for feeding pigs 20 in a barn 22.

Some examples of prior art mechanisms comprise a relatively large hopper 24 for receiving feed 14 from a feed supplier which typically comprises an enclosure such as a storage tower 18 (the hopper may be integral or separate from the bin), and a funnel 26 for receiving feed 14 from hopper 24. Feed mechanism 10 (see FIG. 1) comprises at least one rotatable agitator 28 in funnel 26 for breaking up chunks 12, an auger housing 30 underneath funnel 26 for receiving feed 14 from funnel 26, valve 16 for adjusting the feed flowing from funnel 26 to housing 30, at least one means for conveying which may include any conveyor that may be operated via rotational power such as, but not limited to, a screw conveyor 32 for conveying feed 14 from housing 30 to bins 18 (see FIG. 3), and means for transmitting power (transmission means) 34 for powering the rotation of agitator 28 via the rotational energy of the means for conveying 32. The term, "transmission" means any apparatus for transferring rotational energy from one rotating element to another, such means to be more particularly defined herein.

Figure 4:
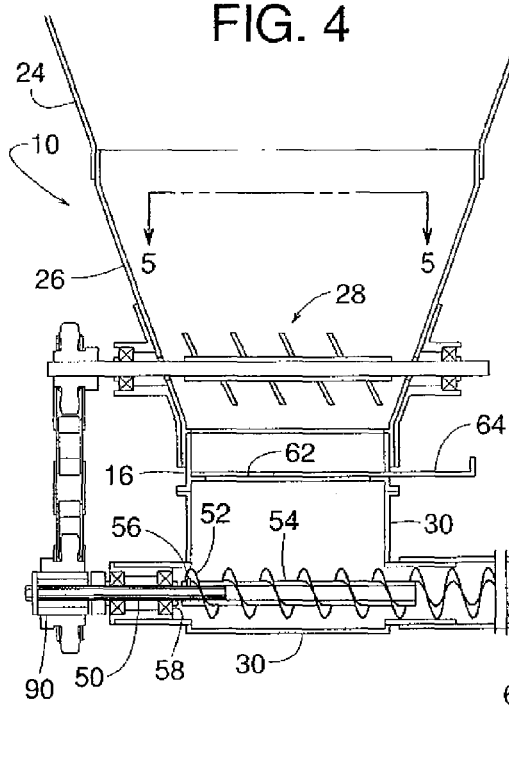
FIG. 4 is a cross-sectional side view similar to FIG. 1 but showing more elements associated with the example animal feed mechanism.
Figure 5:
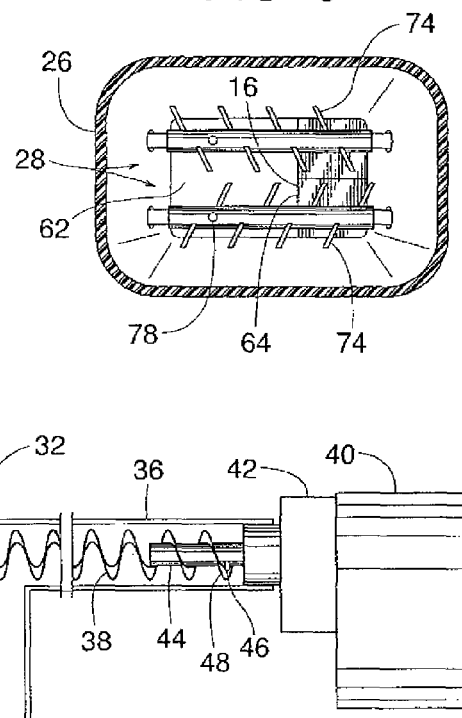
FIG. 5 is a cross-sectional top view taken along line 5-5 of FIG. 4.

Some examples of conveying means such as a screw conveyor 32 and associated hardware as shown in FIGS. 1 and 4 include a feed tube 36 connected to an auger housing 30, a flexible auger 38 extending through feed tube 36 and into housing 30 for urging feed 14 out from within housing 30 and through feed tube 36, a motor 40 with a speed-reducing gearbox 42 and an output shaft 44 for rotating auger 38 (i.e., motor 40 imparts rotational energy to auger 38), a fastener 46 for connecting a proximal end 48 of auger 38 to output shaft 44, a shaft 50 (also referred to as conveyor shaft 50) for supporting a distal end 52 of auger 38, a tubular shaft extension 54 for supporting auger 38 inside auger housing 30, a fastener 56 for attaching the auger's distal end 52 to shaft 50 and/or to shaft extension 54, one or more bearings 58 (e.g., rolling element bearing, journal bearing, bushing, etc.) for supporting shaft 50 relative to auger housing 30, and one or more tubular downspouts 60 (See FIG. 3) extending from feed tube 36 to deliver feed 14 to bins 18. For the illustrated example, feed mechanism 10 includes two screw conveyors 32 that are substantially the same in structure and function in transferring feed 14 from housing 30 to bins 18, however, feed mechanism 10 is not restricted for use with dual auger mechanisms but may be employed with single or multiple auger systems or with any other conveying systems that employ or may be operated through rotational power.

To selectively stop or restrict the flow of feed 14 from funnel 26 to housing 30, a valve 16 may define an adjustable restriction 62 with an open area that is varied. One means of adjustment may comprise adjustably positioning (manually or otherwise) one or more valve plates 64 over restriction 62. Where an adjustable restriction 62 is employed with movable valve plates 64, arrow 66 represents adjusting valve 16 by sliding plate(s) 64 horizontally along a plate-guiding feature 68. In some examples, valve 16 is part of auger housing 30. In other examples, valve 16 is its own component installed between auger housing 30 and funnel 26. In still other embodiments, adjustable restriction 62 may be adjusted via hydraulically powered valving mechanisms of many types.

The opening 16 is positioned generally toward the bottom of the funnel 26 such that the opening through valve 16 is much smaller than the opening between the funnel 26 and the hopper 24. This arrangement results in a substantial flow restriction at valve 16 downstream of the above-funnel 26, so chunks 12 or clumps of feed particulate 14 tend to get hung up in the area just above valve 16. If the chunks 12 are allowed to accumulate, the flow of the particulate matter 14 is reduced and may eventually stop altogether. So, as the particulate matter 14 flows through funnel 26 one or more agitators 28 are rotated to break up any chunks 12 that may be present in the flow of feed 14 from the funnel. The agitator 28 is generally positioned above or within the valve or opening 16 and, although they may be present in many forms, shapes and spacing arrangements and in different numbers, the agitator 28 comprises a shaft 72 and a plurality of generally radial protrusions 74. In some examples, for ease of maintenance and installation, each agitator 28 further comprises a sleeve 70 attached to the shaft 72 (also referred to as the agitator shaft 72) to which said plurality of generally radial protrusions 74 may be affixed or associated therewith. In some examples, sleeve 70 is removably fastened to shaft 72 to facilitate the installation and removal of agitator 28 relative to funnel 26. Installation, for example, can be achieved by first aligning sleeve 70 with holes 76 in funnel 26 and subsequently inserting shaft 72 axially through holes 76 and sleeve 70. After shaft 72 has been inserted through sleeve 70 and holes 76, a common suitable fastening means (e.g., a set screw, another type of screw, roll pin, a shear pin 78, dowel, key, spline, clamp, etc.) firmly holds sleeve 70 to shaft 72, so the two rotate as a unit. Two brackets 80 and a set of bearings 82 (e.g., rolling element bearings, journal bearing, bushing, etc.) support shaft 72 within funnel 26. Said plurality of radial protrusions 74 may include protrusions of uniform size and shape, or of varying size and shape and may extend at a common angle from the shaft 72 (or the sleeve 70) or at varied angles. The protrusions 74 may be integral to the shaft 72 or to the sleeve 70 or may be detachable for ease of replacement if needed.

Upon rotation of the shaft 72 the plurality of radial protrusions 74 are also rotated. When chunks 12 are included in the flow of feed 14, the protrusions 74 break up chunks 12. To further assist in breaking up chunks 12, some examples of feed mechanism 10 include a body of mass 83 disposed within funnel 26 where radial protrusions 74 of rotating agitator 28 can strike and propel body 83 in a generally unrestricted manner (e.g., a free floating body) through the feed particulate 14 in funnel 26. As body 83 gets knocked around and ricochets within funnel 26, body 83 might strike and breakup chunks 12. Examples of body 83 can be of various shapes including, but not limited to, spherical with a smooth outer surface, generally spherical with a dimpled or otherwise roughened outer surface, multifaceted, hollow with holes around its outer periphery, etc. Examples of body 83 can be made of various materials including, but not limited to, metal, steel, iron, brass, stainless steel, cast iron, plastic, various combinations thereof, etc. In some examples, massive body 83 is of sufficient size to prevent body 83 from completely bypassing agitator 28 and subsequently passing through restriction 62 to enter auger housing 30.

Figure 6:
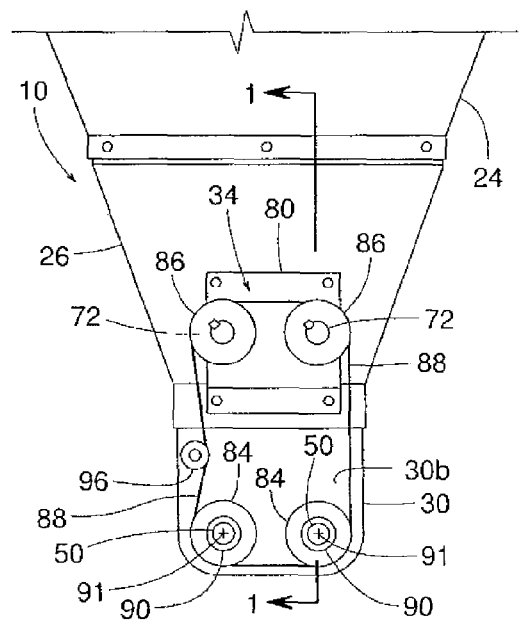
FIG. 6 is an end view showing one end of the example feed mechanism.
Figure 7:
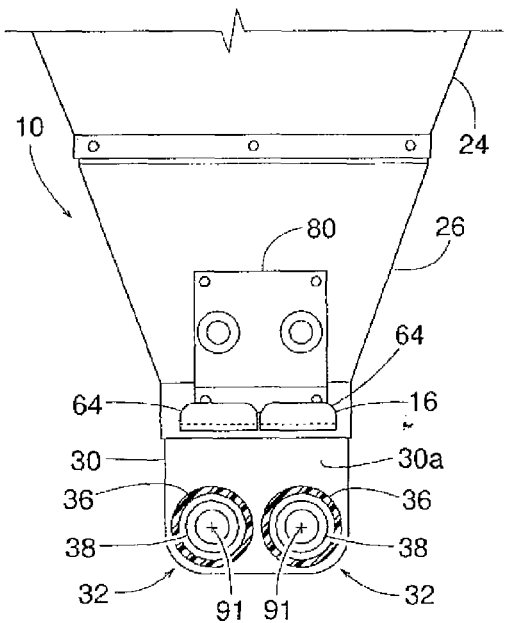
FIG. 7 is an end view showing another end of the example feed mechanism.

Referring now to FIGS. 6 and 7, to power the rotation of said agitator or plurality of agitators 28 via the rotational energy of one or multiple means for conveying 32, some examples of means for transmission 34 comprise two drive wheels 84 (e.g., sprocket, sheave, cogged wheel, etc.) coupled to the two conveyor shafts 50, two driven wheels 86 (e.g., sprocket, sheave, cogged wheel, etc.) keyed or otherwise solidly associated with the two agitator shafts 72, and a flexible drive loop 88 (e.g., roller chain, V-belt, cogged belt, etc.) interconnecting wheels 84 and 86.

In some applications, motors 40 are selectively energized to convey feed 14 only to certain chosen bins 18 via one screw conveyor 32 and/or via another screw conveyor 32. In other words, any motor 40 can be energized alone, or it can be energized concurrently with another or several other motors 40. However, it is recommended that all agitators 28 be in operation regardless of the number of means for conveying 32 and motors 40 in operation. Therefore, to ensure the plurality of agitators 28 are operating regardless of the number of motors 40 energized, each wheel 84 is coupled to its corresponding shaft 50 via a roller clutch 90, such that one roller clutch 90 and one auger 38 share a common rotational axis 91, and another roller clutch 90 and another auger 38 share another common rotational axis 91, wherein the two rotational axes 91 are radially spaced apart from each other. The term, "roller clutch" refers to any device that controls engagement between a shaft and a wheel mounted thereon such that when the shaft rotates in one direction, the device forces the wheel to rotate with the shaft so that the wheel and the shaft rotate together as a unit, but when the shaft rotates more slowly than the other or ceases rotation, the device allows the wheel to freely rotate on its own without requiring the shaft to rotate with it. In other words, a roller clutch can only transmit significant torque in one direction of rotation while allowing free-wheeling or overrunning in the opposite direction or at stall. Alternate terms used for a roller clutch or comparable devices thereof include, a unidirectional clutch, freewheel, rotational ratchet, clutch bearing, and sprag.

In some examples, roller clutch 90 includes a Timken RCB 121616 outer race (e.g., item 90a) affixed to drive wheel 84. In some examples, roller clutch 90 also includes a Timpken IR 081216 needle bearing inner race (e.g., item 90b) affixed to conveyor shaft 50 (affixed, for example, via item 90b being axially clamped between a collar 92 and a screw/washer 94). The Timpken Company has its headquarters in Canton, Ohio.

The operation of one example means for transmission 34 is perhaps best understood with reference to FIGS. 6 and 7, wherein FIG. 7 shows feed tubes 36 extending from a first end 30a of auger housing 30, and FIG. 6 shows transmission 34 in proximity with a second end 30b of auger housing 30. FIG. 6 also shows an optional idler wheel 96 for taking up possible slack in drive loop 88. In this example, each roller clutch 90 forces its corresponding drive wheel 84 to rotate with its corresponding conveyor shaft 50 when conveyor shaft 50 rotates in a first direction, e.g., counterclockwise as viewed from the perspective shown in FIG. 6 (i.e., looking at the drawing sheet). Each roller clutch 90 also allows free-wheeling relative rotation between its corresponding drive wheel 84 and its respective conveyor shaft 50 when drive wheel 84 is forced to rotate slower or faster relative to its corresponding conveyor shaft 50. The installed orientation of roller clutches 90 and the resulting aforementioned example counterclockwise direction is chosen based on the right-hand or left-hand helix of auger 38.

Consequently, in this example, if only one motor 40 is energized (either one), that motor 40 will drive the rotation of its corresponding auger 38 and conveyor shaft 50, which in turn will rotate all four wheels 84 and 86 via drive loop 88, and thus will rotate both agitators 28; however, one roller clutch 90 will allow free-wheeling of the drive wheel 84 that is associated with the inactive auger 38 connected to the de-energized motor 40 albeit both agitators 28 will still rotate. Energizing both motors 40 rotate both augers 38 and both agitators 28.

Although the actual construction of animal feed mechanism 10 may vary, in some examples, hopper 24 and auger housing 30 are comprised of sheet metal while funnel 26 is comprised of plastic. Hopper 24 is much larger than funnel 26, so hopper 24 is suitable for holding and storing a large quantify of feed 14. Funnel 26, on the other hand, is designed for channeling feed 14 from hopper 24 to auger housing 30. Consequently, funnel 26 is designed to be much smaller than hopper 24, which makes funnel 26 readily producible via plastic injection molding. Funnel 26 being made of plastic also provides a break or interruption in electrical continuity between the two metal components, hopper 24 and auger housing 30. Such a break or interruption in electrical continuity might be beneficial in the occurrence of potential electrical problems, e.g., lightening and/or electrostatic sparking/ignition. Placing agitator 28 within a plastic housing (i.e., funnel 26) rather than inside a metal housing, such as inside hopper 24 or inside auger housing 30, may provide additional benefits. If agitator 28, for example, were inside a sheet metal housing, noise generated by agitator 28 might be amplified by the sheet metal in a manner perhaps similar to a violin string transmitting its vibration to the bouts or body of a violin. Plastic, on the other hand, might be more effective at dampening noise generated by agitator 28. All that said, funnel 26 may be reasonably constructed of metal or any other material conducive to facilitating the flow of feed along its surface.

Figure 8:
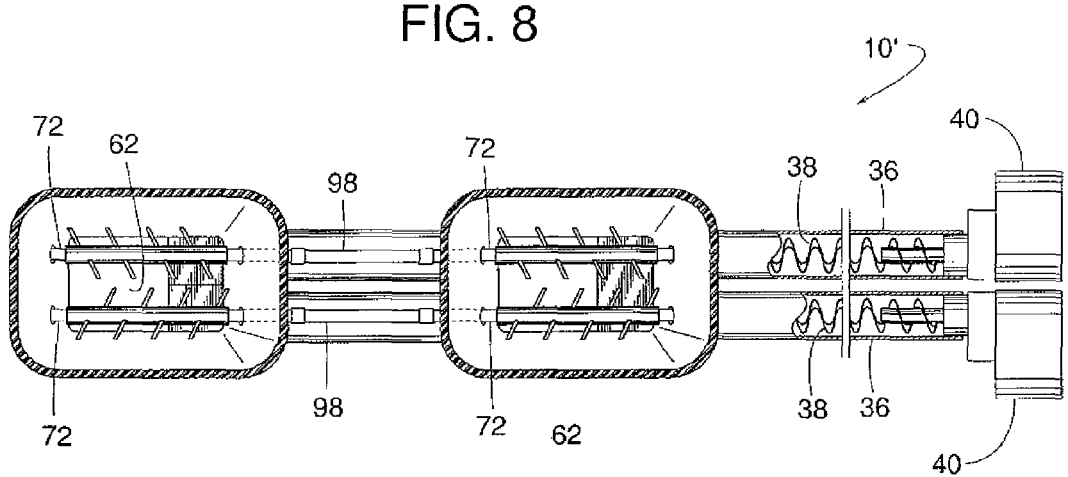
FIG. 8 is a cross-sectional top view similar to FIG. 5 but showing another example of an animal feed mechanism.
Figure 9:
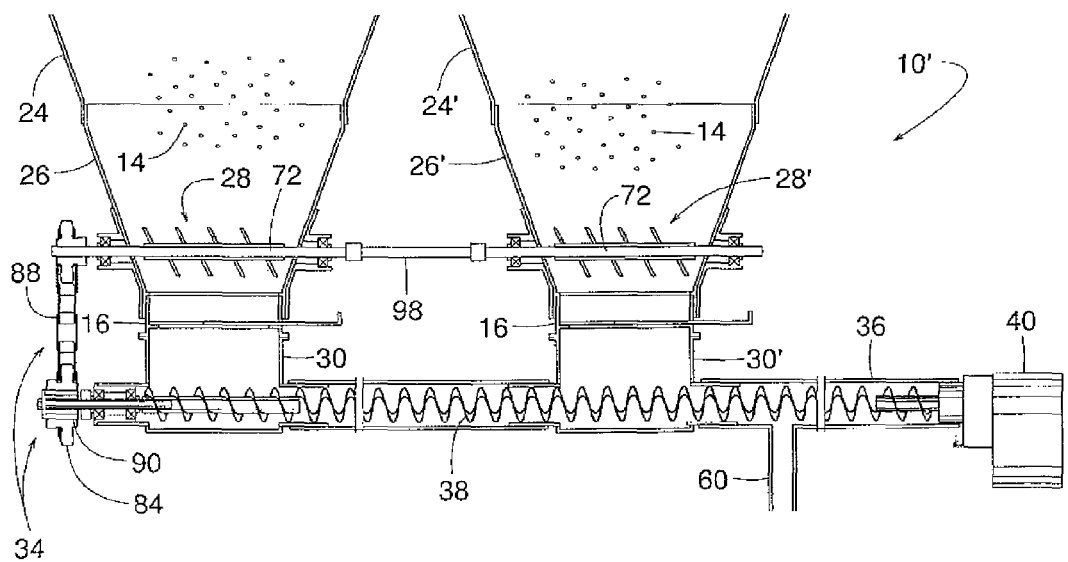
FIG. 9 is a cross-sectional side view similar to FIG. 4 but showing the example feed mechanism of FIG. 8.

In some examples, as shown in FIGS. 8 and 9, an animal feed mechanism 10' further comprises a second hopper 24' for receiving feed 14, a second funnel 26' spaced apart from first funnel 26 for receiving feed 14 from second hopper 24', a second agitator 28' disposed within second funnel 26', a second auger housing 30' disposed underneath second funnel 26' for receiving feed 14 from second funnel 26', and at least one drive shaft 98 coupling first agitator 28 in first funnel 26 to the second agitator 28' in second funnel 26'. Drive shaft 98 causes the rotation of agitator 28 in first funnel 26 to rotate agitator 28' in second funnel 26', thus only one transmission 34 is used for driving agitators 28 and 28' in two separate funnels 26 and 26'. In this illustrated example, both augers 38 extend through both auger housings 30 and 30'.

The animal feed mechanism is designed for simple and easy installation. It mounts outside the usual elements of an augering system i.e if the existing system includes a hopper 24 and a funnel, then the openings 76 may be drilled in the funnel 26. The sleeve 70 may be inserted through the bottom of the funnel 26 and the shaft 72 may be threaded through the first of the openings 76, through the sleeve 70, and then through the second opening 76 thereby creating an agitator 28. One end of the shaft 72 may be secured via bracket 80 and bearings 82, and on the opposite end by bracket 80 and bearings 82 and a plate comprising a connecting wheel 86. Repeat for additional shafts 72 and sleeves 70. The flexible drive loop 88 is then draped over the connecting wheel 86 for each of the agitator shafts 72. On the second end 30b of auger housing 30 each auger shaft 50 is associated with one of the connecting wheels 84 (which may be a sprocket). The flexible drive loop 88 is then aligned over connecting wheels 84 and inside idler wheel 96, if present. Upon actuation of the auger shaft(s) 50, the flexible drive loop rotates with the shaft causing the connecting wheels 86 to rotate, in turn causing the agitator(s) 28 to rotate and reduce the number and/or size of the chunks 12, if present. In this manner, little or no disassembly of the prior system is necessary so that installation can be completed by a single person in an hour, or by two in a bit less time.

The reduction of chunks 12 by the agitators does more than simply improve feed flow. The use of the present invention results in more uniform feed flow and the presence of the agitators provides vibrational movement to the stream of feed flowing and to the boot. The combination of the reduction in chunks, more uniform feed flow, and the vibrational patterns set up by the agitators measurably reduce feed bridging in the upper portions of the feed supplier/storage bin Thus, the present invention has been described in an illustrative manner. It is to be understood that the terminology that has been used is intended to be in the nature of words of description rather than of limitation.

Although the invention is described with respect to a preferred embodiment, modifications thereto will be apparent to those of ordinary skill in the art. For example, it is well within the scope of the invention to add guarding around various moving parts including, but not limited to, drive shaft 98, transmission 34, etc. It is also well within the scope of the invention to add gaskets, seals and/or shields wherever desired. The number of agitators, the spacing and shape of the plurality of protrusions on the agitator, the size of the boot, the method of installation and connections, and the materials from which any of the parts are made may have effective alternative embodiments within the scope of this invention. Therefore, within the scope of the appended claims, the present invention may be practiced otherwise than as specifically described.

What I claim is:

1. An animal feed mechanism for handling feed, the animal feed mechanism comprising:
    a first hopper for receiving a stream of animal feed;
    a first generally funnel-shaped housing for receiving at least a portion of the feed stream from the first hopper;
    an auger housing;
    first means for conveying disposed on a first rotatable shaft at least partially within said auger housing and positioned generally downstream from the first hopper;
    means to provide power for rotating said rotatable shaft;
    means for transmitting power associated with at least one of the first generally funnel-shaped housing and the auger housing, said means for transmitting power further coupled to a first agitator positioned downstream of said first hopper, and transferring rotational energy from the first rotatable shaft to the first agitator;
    said first rotatable shaft having a first axis of rotation and said first agitator having a second axis of rotation wherein said first axis and said second axis are parallel and wherein the first agitator comprises a first agitator shaft, a first sleeve disposed on the first agitator shaft, and a first plurality of radial protrusions extending from the first sleeve.

2. An animal feed mechanism for handling feed, the animal feed mechanism comprising:
    a first hopper for receiving a stream of animal feed;
    a first generally funnel-shaped housing, for receiving at least a portion of the feed stream from the first hopper;
    an auger housing;
    first means for conveying disposed on a first rotatable shaft at least partially within said auger housing and positioned generally downstream from the first hopper;
    means to provide power for rotating said rotatable shaft;
    means for transmitting power associated with at least one of the first generally funnel-shaped housing and the auger housing, said means for transmitting power further coupled to a first agitator positioned downstream of said first hopper, and transferring rotational energy from the first rotatable shaft to the first agitator;
said first rotatable shaft having a first axis of rotation and said first agitator having a second axis of rotation wherein said first axis and said second axis are parallel, further comprising:
    a second agitator disposed downstream of the first hopper; and
    a second means for conveying disposed on a second rotatable shaft within said auger housing, said second rotatable shaft being rotatable independently of the first rotatable shaft wherein the rotational energy imparted by means to provide power rotates both the first agitator and the second agitator regardless of whether the second rotatable shaft is rotating.

3. An animal feed mechanism for handling feed, the animal feed mechanism comprising:
    a generally funnel-shaped housing into which a feed stream flows; at least one agitator disposed for rotation about a first axis of rotation positioned substantially within the generally funnel-shaped housing for minimizing chunks in the feed stream and providing vibrational patterns to deter feed bridging;
    at least one auger disposed downstream of the first generally funnel-shaped housing for receiving the feed stream said auger having a second axis of rotation;

at least one power source to impart rotational energy to said at least one auger;

a transmission means for transferring the rotational energy from the at least one auger to the at least one agitator to rotate the at least one agitator wherein said first and second axes of rotation are parallel and at least one of said at least one agitator comprises an agitator shaft, a sleeve disposed on the agitator shaft, and a plurality of radial protrusions extending from the first sleeve.

4. An animal feed mechanism for handling feed, the animal feed mechanism comprising;

a generally funnel shaped housing for transmitting a feed stream;

an agitator disposed generally in said housing for rotation therein to reduce feed chunks and increase uniformity of feed flow;

an auger disposed downstream of the housing and said agitator;

a power source for rotating the auger;

a transmission means associating the auger with the agitator for transmitting rotational power from the auger to the agitator;

said feed mechanism further comprising at least a second agitator, and at least a second auger, the transmission means transferring rotation of the first auger to the first agitator when the first auger is powered and the second auger is powered, the transmission means transferring rotation of the second auger to the first agitator when the second auger is powered and the first auger is powered, the transmission means transferring rotation of at least one of the first auger and the second auger to the first agitator when both the first auger and the second auger are powered concurrently.

5. The animal feed mechanism of claim 4, wherein the transmission means includes at least one roller clutch associated with one of said augers and at least one drive loop.

6. The animal feed mechanism of claim 4 wherein said agitator comprises a sleeve having a plurality of protrusions and through which a shaft having a first end and a second end is inserted.

7. The animal feed mechanism of claim 4, further comprising:

a first roller clutch coupled to the first auger, the first roller clutch and the first auger being disposed along a first rotational axis; and a second auger and a second roller clutch coupled to said second auger, the second auger and the second roller clutch being disposed along a second rotational axis;

said first roller clutch and said second roller clutch each associated with a drive loop.

* * * * *